(12) United States Patent
Wang et al.

(10) Patent No.: US 9,877,213 B1
(45) Date of Patent: Jan. 23, 2018

(54) INTEGRATED MINIMIZATION OF DRIVE TEST (MDT) AND TICKETING IN A MOBILE COMMUNICATION NETWORK

(71) Applicant: Sprint Communications Company L.P., Overland Park, KS (US)

(72) Inventors: Yu Wang, Fairfax, VA (US); Zheng Fang, McLean, VA (US); Zheng Cai, Fairfax, VA (US); Udit Thakore, Fairfax, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/351,423

(22) Filed: Nov. 14, 2016

(51) Int. Cl.
| | |
|---|---|
| *H04B 17/309* | (2015.01) |
| *H04B 17/318* | (2015.01) |
| *H04W 24/04* | (2009.01) |
| *H04L 29/12* | (2006.01) |
| *H04L 12/24* | (2006.01) |
| *H04W 4/02* | (2009.01) |
| *H04W 8/04* | (2009.01) |
| *H04W 16/26* | (2009.01) |
| *H04W 16/28* | (2009.01) |

(52) U.S. Cl.
CPC .......... *H04W 24/04* (2013.01); *H04B 17/309* (2015.01); *H04B 17/318* (2015.01); *H04L 41/5032* (2013.01); *H04L 41/5074* (2013.01); *H04L 61/6054* (2013.01); *H04W 4/02* (2013.01); *H04W 8/04* (2013.01); *H04W 16/26* (2013.01); *H04W 16/28* (2013.01)

(58) Field of Classification Search
CPC ............................ H04B 17/309; H04B 17/318
See application file for complete search history.

(56) References Cited

U.S. PATENT DOCUMENTS

| | | | |
|---|---|---|---|
| 2006/0142913 A1* | 6/2006 | Coffee | .................... B28C 5/422 701/29.3 |
| 2012/0100884 A1* | 4/2012 | Radulescu | ........ H04W 36/0083 455/524 |

* cited by examiner

*Primary Examiner* — Asghar Bilgrami

(57) ABSTRACT

A method of remediating wireless communication issues. The method comprises receiving a ticket by a ticket server computer that identifies a mobile communication device and identifies a service issue category, transmitting the mobile communication device identity and the service issue category to a resolution server computer, analyzing the service issue category by the resolution server computer, based on the analyzing of the service issue category, initiating a minimization of drive test (MDT), a subscriber trace, or a cell trace in a wireless communication network by the resolution server computer, where the wireless communication network provides wireless communication service to the mobile communication device and where the wireless communication network comprises a plurality of cell sites, analyzing the results of the MDT or trace by the resolution server computer; and initiating a corrective action in the mobile communication device or in the wireless communication network.

20 Claims, 11 Drawing Sheets

INTEGRATED MINIMIZATION OF DRIVE TEST (MDT) AND TICKETING IN A MOBILE COMMUNICATION NETWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices provide both voice call and data communication service to users in locations all over the United States. Users have become dependent on their mobile communication devices, to some extent, and expect them to provide a high standard of communication quality and to have high availability. Meeting these user expectations can be a challenge, given the large number of involved cell sites used to provide wireless coverage and the large number of ever changing device models the radio access network is called upon to support.

SUMMARY

In an embodiment a method of identifying and remediating wireless communication issues is disclosed. The method comprises receiving a ticket from a mobile communication device by a ticket server computer, where the ticket identifies the mobile communication device and identifies a service issue category and where the ticket server computer manages a wireless communication network ticketing system, storing the ticket in a ticket data store by the ticket server computer, and transmitting the mobile communication device identity and the service issue category of the ticket from the ticket server computer to a resolution server computer, where the resolution server computer is part of an operation subscriber subsystem that comprises a core element management system (core EMS), a home subscriber system (HSS), and a radio access network element management system (RAN EMS). The method further comprises analyzing the service issue category by the resolution server computer, based on the analyzing of the service issue category, initiating a minimization of drive test (MDT) in a wireless communication network by the resolution server computer, where the wireless communication network provides wireless communication service to the mobile communication device and where the wireless communication network comprises a plurality of cell sites, analyzing the results of the MDT by the resolution server computer, and based on the analyzing of the results of the MDT, initiating a corrective action in the mobile communication device or in the wireless communication network.

In another embodiment, a method of identifying and remediating wireless communication issues is disclosed. The method comprises receiving a plurality of ticket report messages by a resolution server computer, where each ticket report message comprises a mobile communication device identity and a service issue category and where the resolution server computer is part of an operation subscriber subsystem that comprises a core element management system (core EMS), a home subscriber system (HSS), and a radio access network element management system (RAN EMS), determining by the resolution server computer that at least a threshold number of the plurality of ticket report messages are associated with a same area, and analyzing the service issue category of each of the ticket report messages associated with the same area by the resolution server computer. The method further comprises based on the analyzing of the service issue category of each of the ticket report messages associated with the same area, initiating a management-based minimization of drive test (MDT) or a cell trace in a wireless communication network by the resolution server computer commanding the RAN EMS to perform the management-based MDT or cell trace, where the wireless communication network provides wireless communication service to the identified mobile communication devices, the wireless communication network comprises a plurality of cell sites, and the management-based MDT or cell trace is directed towards cell sites in the same area that the threshold number of ticket report messages are associated with, analyzing the results of the management-based MDT or cell trace by the resolution server computer, and based on the analyzing of the results of the management-based MDT or cell trace, initiating a corrective action in the wireless communication network.

In yet another embodiment, a method of identifying and remediating wireless communication issues is disclosed. The method comprises receiving a ticket report message by a resolution server computer, where the ticket report message comprises a mobile communication device identity and a service issue category and where the resolution server computer is part of an operation subscriber subsystem that comprises a core element management system (core EMS), a home subscriber system (HSS), and a radio access network element management system (RAN EMS), analyzing the service issue category of the ticket report message by the resolution server computer, based on the analyzing of the service issue category of the ticket report message, iteratively initiating a signaling-based minimization of drive test (MDT) or a subscriber trace in a wireless communication network by the resolution server computer commanding the core EMS to perform the signaling-based MDT, where the wireless communication network provides wireless communication service to a mobile communication device identified by the mobile communication device identity in the ticket report message, the wireless communication network comprises a plurality of cell sites, and the signaling-based MDT comprises collecting radio signal metrics for the mobile communication device for a serving cell site of the mobile communication device and cell site nearest neighbors to the serving cell site, analyzing the iterated results of the signaling-based MDTs by the resolution server computer, and based on the analyzing of the iterated results of the signaling-based MDTs, initiating a corrective action in the mobile communication device or in the wireless communication network.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

Figure 1:
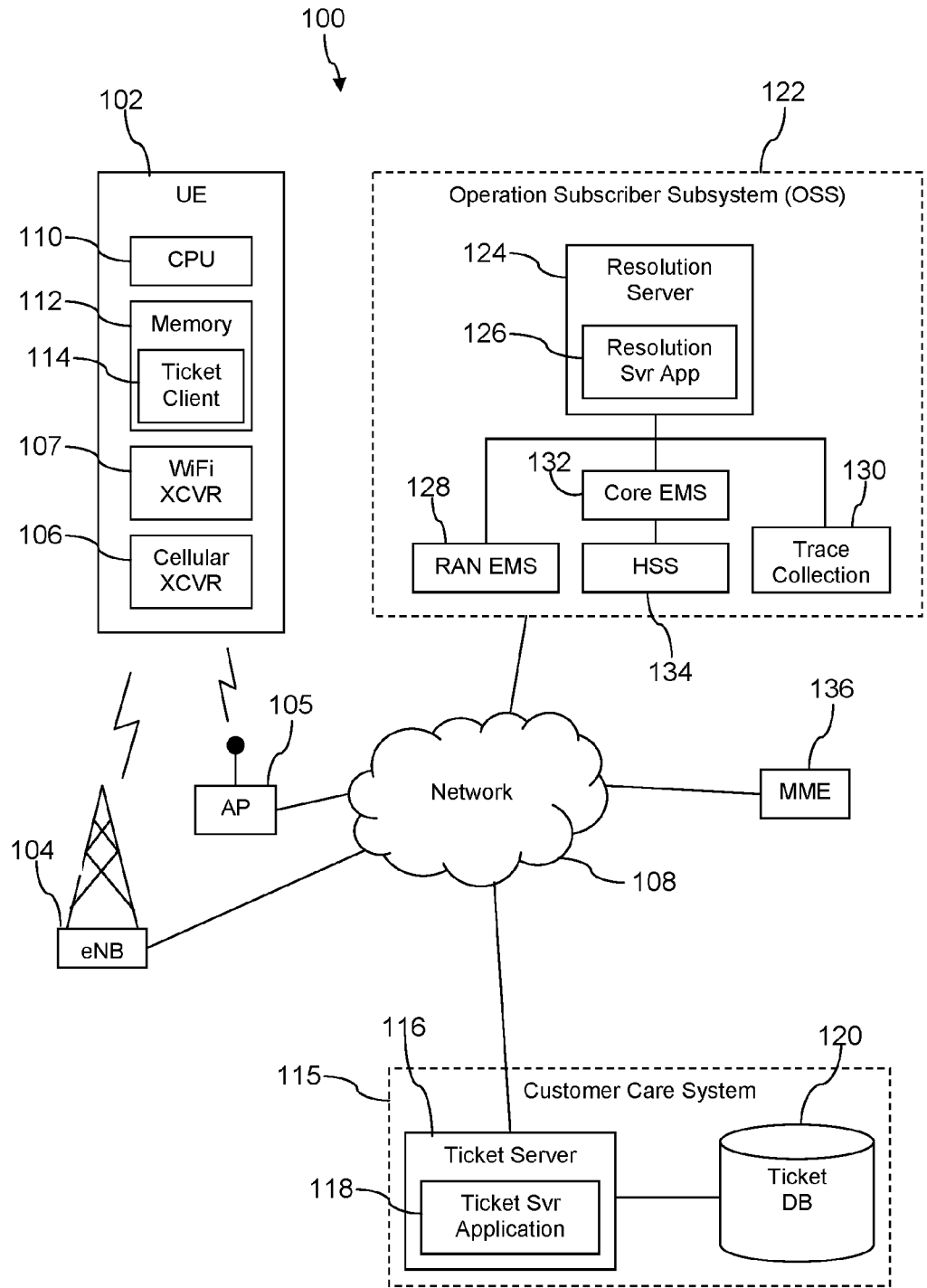
- FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system that bridges or integrates a ticketing system for a wireless communication network and an operation subscriber subsystem (OSS), or more particularly integrates ticketing with a resolution server in the OSS that launches minimization of drive tests (MDTs), subscriber traces, and/or cell traces based on tickets in the ticketing system. In an earlier system, one where the ticketing system is decoupled from the OSS, a ticket may be created and stored in a ticket data store. A ticket may also be referred to as a trouble ticket and may document some performance issue experienced in a telecommunication system. In time, a technician or worker would be assigned to work the ticket. This worker may manually log into an element management system (EMS) of the OSS, manually trigger running diagnostic tests, such as an MDT, a subscriber trace, and/or a cell trace, and manually analyze the results of the tests. But this approach is less responsive, less timely, and less flexible. By the time a test is run, the wireless network operating condition that led to the creation of the ticket may have passed away. The system taught herein is both more timely and more flexible. For example, root causes of tickets may be identified and remediated more promptly by using the system taught herein.

A ticket client application may execute on user equipments (UEs) that obtain wireless communication links from the wireless communication network. A user of the UE may use the ticket client to create and transmit tickets to a ticket server application executing on a ticket server computer, for example when communication performance of the UE does not satisfy the user. Alternatively, the ticket client itself can monitor operating conditions on the UE, create a ticket, and transmit the ticket to the ticket server application automatically, without direct involvement of the user. The ticket server application may store the ticket in a ticket data store. The ticket server may analyze the ticket to determine how to process the ticket. For example, the ticket may include an identification of a serving cell site which provides wireless coverage to the UE, an identification of the UE such as an international mobile subscriber identity (IMSI), an issue category that coarsely defines the trouble experienced by the UE, operating environmental conditions on the UE, and other information. Under some analyses, the ticket server may send the ticket data to a resolution server application executing on the resolution server.

The resolution server application analyses the ticket data and may take a variety of actions. For example, if the issue category indicates "poor voice service" or "poor data service" and the operating environment conditions of the UE indicate that its WiFi radio is turned off, the resolution server application may command the ticket server application to advise the ticket client application to turn the UE's WiFi radio ON. If other information in the ticket data indicates that the firmware/software version of the UE is obsolete, the resolution server application may command the ticket server application to advise the ticket client to upgrade firmware and/or software on the UE. In some cases the resolution server application may seek to obtain additional diagnostic information by triggering a minimization of drive test (MDT), a subscriber trace, and/or a cell trace.

In an embodiment, there are two different variants of MDT that the OSS can execute: a signaling-based MDT and a management-based MDT. The signaling-based MDT is restricted to collecting diagnostic information associated with one UE. The management-based MDT is directed to collecting diagnostic information from a plurality of UEs receiving wireless coverage from one of a plurality of cell sites located in an area of interest. The resolution server application may trigger execution of the signaling-based MDT when an isolated UE is determined to have an issue. The resolution server application may trigger execution of the management-based MDT when ticket client applications on a number of UEs in the same general area have created tickets on the same issue or a related issue, for example a number of UEs equal to or exceeding a predefined threshold number. In some cases, because the resolution server application may trigger execution of the MDT in response to receipt of ticket data related to a ticket client application creating a ticket, the ticket client application may be said to trigger the MDT, for example to indirectly trigger the MDT.

The resolution server application may iteratively execute the signaling-based MDT for a specific UE over a time duration, for example periodically every minute, every five minutes, every 15 minutes, or some other period for a time duration of a day, two days, a week, or some other time duration. The resolution server application may configure the UE with the period of repetition of the MDT and the duration of the periodic iteration of the MDT. The resolution server application may configure the UE to execute the signaling-based MDT every minute for a period of four hours. The data that is collected from repeated iterations of the MDT may provide a fuller picture that promotes improved root cause analysis for some performance issues.

The MDT may collect a variety of information related to one or more UEs and related to one or more cell sites. The MDT may collect radio signal received power (RSRP) and radio signal received quality (RSRQ) for a serving cell site and one or more cell site neighboring the serving cell site of a UE. The MDT may collect geo-location of the UE, for example the GPS coordinates of the UE. The MDT may further collect internet protocol (IP) data throughput and radio link failure data for the serving cell site. The resolution server may configure the specific metrics and parameter values that the UE is to report. Alternatively, in an embodiment, the metrics and parameter values reported by the UE may be predefined and/or fixed.

The resolution server, in addition to triggering execution of the MDT, may also trigger execution of a subscriber trace that provides a subscriber's layer 3 message call level diagnostics which may be used to derive a call level, for example to derive a connection drop rate, a handover failure rate, and other operating conditions. Alternatively, for example when executing a management-based MDT, the resolution server may trigger execution of a plurality of subscriber traces on a plurality of UEs. A subscriber trace captures and reports a plurality of the layer 3 messages associated with a subscriber in the Uu interface, the S1 interface, and the X2 interface that the resolution server can analyze to determine an overall call level performance for a subscriber.

The diagnostics collected by the MDT and the traces may be directed to different purposes but may, in some circumstances, be complimentary or provide a more complete total diagnostic picture when analyzed together. Without limitation, the MDT is generally intended to promote finding radio coverage holes and/or radio coverage overshoots, while the trace is intended to expose call level or connection level problems. In some embodiments of the system taught herein, the MDT and/or traces may be used to promote other purposes. The MDT provides a picture of the radio environment in which a user equipment or a plurality of user equipments operate as well as their precise geo-location, and the traces provide layer 3 messaging call level metrics on one or more UEs.

Based on the results of the MDTs and optionally based on the results of the subscriber trace and/or cell trace, the resolution server application can initiate or promote taking remedial actions. For example, the resolution server application can recommend turning ON a WiFi transceiver of the UE. The resolution server application can command cell sites to adapt their operation parameters, for example reconfiguring antenna tilt angle, reconfiguration a power amplifier level of a radio transceiver of the cell site, and other reconfigurations. The resolution server application can send a report to a responsible individual or role to recommend fixing a wireless coverage hole, for example to build a new cell site to fill the wireless coverage hole. The resolution server application can also identify coverage overshoots—where the radio coverage of a cell site extends further than desirable and may begin to interfere with another cell site or degrade the quality of served UEs. The resolution server application can also employ a test, adapt, test again, adapt again, test yet again, adapt yet again technique where the configuration and/or operating parameters of one or more UEs or one or more cell sites are adjusted to optimize the wireless network performance.

Turning now to FIG. 1, a system 100 is described. In an embodiment, system 100 comprises a user equipment (UE) 102 having a cellular radio transceiver 106 that receives a wireless communication link from a cell site 104 that communicatively couples the UE 102 to a network 108. The UE 102 may be a mobile communication device such as a mobile phone, a personal digital assistance (PDA), a wearable computer, a headset computer, a media player, a laptop computer, a notebook computer, or a tablet computer. It is understood that the system 100 may comprise any number of UEs 102, and the UEs 102 may comprise any mix of the different kinds of mobile communication devices listed above. The system 100 may further comprise any number of cell sites 104. The cell sites 104 may be enhanced node Bs (eNBs), base transceiver stations (BTSs), or a mix of eNBs and BTSs. The cell site 104 may provide a wireless communication link to the UE 102 according to a long-term evolution (LTE), a code division multiple access (CDMA), a global system for mobile communication (GSM), or a worldwide interoperability for microwave access (WiMAX) telecommunication protocol. In some cases, the cell site 104 may provide wireless communication links according to two or more of the identified wireless communication protocols at the same time.

In an embodiment, the UE 102 further comprises a WiFi radio transceiver 107 that may receive a wireless communication link from a WiFi access point (AP) 105 that communicatively couples the UE 102 to the network 108. The network 108 comprises one or more private networks, one or more public networks, or a combination thereof. The UE 102 may conduct a voice call and/or a data call with another UE (not shown), with a content server (not shown), with an application server (not shown), or some other host (not shown) via the cellular radio transceiver 106, the cell site 104, and the network 108. Alternatively, the UE 102 may conduct the voice call and/or the data call with another communication device via the WiFi radio transceiver 107, the WiFi AP 105, and the network 108. Under some circumstances, for example when the UE 102 is located within a large building, the cellular radio signal received by the cellular radio transceiver 106 from the cell site 104 may be weak, and under such circumstances it may be desirable for the UE 102 to instead conduct radio communications via the WiFi radio transceiver 107 to the WiFi AP 105. In some embodiments, the UE 102 may automatically switch wireless communications to the WiFi radio transceiver 107 when a WiFi signal is present (e.g., when the WiFi AP 105 is detected) and when the signal strength of the cell site 104 is below a threshold signal strength or signal quality. This selection of the WiFi radio transceiver 107 may be contingent on the user of the UE 102 turning ON the WiFi radio transceiver 107. Some users may turn OFF the WiFi radio transceiver 107 to conserve battery power or for another reason.

The UE 102 further comprises a central processing unit (CPU) 110 and a memory 112 that stores a ticket client application 114 in a non-transitory portion of the memory 112. When executed by the CPU 110, the ticket client application 114 provides a variety of functionality supporting creation of tickets to be sent to a ticket server 116 as well as some functionality to reconfigure the UE 102 based on commands received from the ticket server 116. The ticket client application 114 may provide an interface for a user of the UE 102 to create and transmit a ticket to the ticket server 116. A ticket may be a vehicle for keeping track of a reported issue with a mobile communication device and/or with a mobile communication system. A ticket may be a data artifact stored by the ticket server 116 in a ticket data store 120. A ticket may be tracked and worked by employees of a mobile communication service provider or other telecommunications business, for example taking corrective action to remediate the reported issue. The ticket may have an identity, such as a ticket number, as well as data or information regarding the reported issue.

The ticket client application 114 may auto-populate some of the data associated with the ticket, for example one or more of an international subscriber identity (IMSI) associated with the UE 102 that may serve as the identity of the UE 102 and/or of the subscription account, an electronic serial number (ESN), a mobile equipment identity (MEID), or other hardware unique identifier of the UE 102, an identity of a serving cell site (e.g., cell site 104), an identity of one or more proximate cell sites, a global positioning system (GPS) location of the UE 102, an ON or OFF status of the WiFi radio transceiver 107 of the UE 102, a hardware version identity of the UE 102, a software version identity of the UE 102, a version identity of a preferred roaming list (PRL) of the UE 102, a current date and time, and other data.

The ticket client interface may prompt the user to select an issue category that identifies an issue that the user experiences during use of the UE 102. For example, issue categories may comprise "poor voice service," "poor data service," "excess dropped calls," "excess blocked calls," "slow content download," "slow message service," and the like. The interface may prompt the user to select an issue severity level as one of minor, moderate, and severe or some other range of severity level values. When the user has provided input, the user may select a create operation which will create the ticket and send it to the ticket server 116. The ticket includes the automatically populated data as well as the user input data (e.g., the issue category and the issue severity level).

In an embodiment, the ticket client application 114 is able to automatically detect communication issues with the UE 102, automatically create a ticket, and automatically transmit the ticket to the ticket server 116, without any intervention by the user of the UE 102. For example, the ticket client application 114 may track historical performance of the UE 102, analyze the history to define device-specific performance norms, and automatically create a ticket when current performance deviates by more than a predefined threshold from the self-determined performance norms. Alternatively, the ticket server 116 may define and distribute performance norms to a plurality of UEs 102, for example UEs 102 of the same make and model and having a common service plan. Also, when the ticket client application 114 determines that performance of the UE 102 deviates by more than the predefined threshold from performance norms, the ticket client application 114 may open a window on a display of the UE 102 to prompt the user to create a ticket, auto-populating some of the ticket information and prompting the user to enter or select other data to include in the ticket.

A ticket server application 118 executes on the ticket server 116. The ticket server application 118 may be stored in a non-transitory portion of a memory of the ticket server 116. The ticket server application 118 receives and processes tickets transmitted by the ticket client application 114. In an embodiment, the ticket server application 118 stores the ticket in a ticket data store 120. In an embodiment, the ticket server application 118 may analyze the issue category provided in the ticket and take remedial action on its own, for example sending a command to the UE 102 to change a configuration setting. For example, the ticket server application 118 may command the ticket client application 114 to turn ON the WiFi radio transceiver 107. In an embodiment, the ticket client application 114 may open an input screen to prompt the user to approve the remedial action before the action is performed. The ticket server 116 executing the ticket server application 118 and the ticket data store 120 may be considered to constitute, at least in part, a customer care system 115. It is understood that the customer care system 115 may comprise additional components, for example care representative workstations, headsets, an interactive voice recognition system, and/or other components.

Alternatively, the ticket server application 118 may send the ticket to another place to be resolved. If the ticket server application 118 determines that the same UE 102 has repeatedly submitted tickets at different times having the same issue category, the ticket server application 118 may send the data associated with the ticket along with an indication that tickets with the same issue category have been repeatedly created by the UE 102 to a ticket analyst for handling. In other circumstances, the ticket server application 118 may send the data associated with the ticket to a resolution server application 126 that executes on a resolution server 124 in an operation subscriber subsystem (OSS) 122. The OSS 122 further comprises a radio access network element management system (RAN EMS) 128, a trace collection 130, a core element management system (EMS) 132, and a home subscriber system (HSS) 134.

An EMS is a computer-based tool or application that executes on a computer system and provides an interface to control and monitor the operating condition of telecommunication network equipment. Often vendors of telecommunication network equipment provide EMSs to support their network equipment which may be referred to as network elements in some contexts. A HSS stores subscribers' profile information such as an identity or definition of a service subscription plan, the IMSI, and other service related parameters. This information may be used, for example by a mobility management entity (MME), for authenticating the UE 102 for use of the RAN—e.g., to authorize granting a wireless link to the UE 102.

The resolution server application 126 is stored in a non-transitory portion of a memory of the resolution server 124. The resolution server application 126 analyzes the ticket data received from the ticket server application 118 and may choose various actions for further processing and/or taking action on the ticket. The ticket server application 118, for example, may trigger a signaling-based minimization of drive test (MDT) or a management-based MDT to be performed. The ticket server application 118, for example, may trigger a subscriber based trace to be performed on the UE 102 and/or may trigger a cell based trace to be performed on a plurality of UEs 102 served by the same cell site and neighbor cell sites.

An MDT is described at a high level as part of the 3GPP Release 10 specification. In general, the MDT is hoped to provide much of the benefit of conventional drive tests while avoiding the high costs of conventional drive tests. A management-based MDT opportunistically recruits a plurality of UEs in the coverage area of several proximate cell sites and collects various performance data from those UEs, for example RSRQ and RSRP metrics as well as geo-location data of the UEs. This opportunistically collected data provides most of the information that would be collected in a conventional drive test without the actual driving of a wireless service provider owned vehicle and without assigning wireless service provider employees to perform the testing. The resolution server 124 and resolution server application 126 are in communication with the core element management system (EMS) 132 and the radio access network element management system (RAN EMS) 128.

To trigger a signaling-based MDT, the resolution server application 126 sends an MDT triggering command to the core EMS 132, and the core EMS 132 executes the signaling-based MDT by communicating with the cell site 104 via the HSS 134 and a mobility management entity 136. The cell site 104 commands the UE 102 to execute the MDT and may provide instructions on a periodic iteration rate and a duration of the iteration of the MDT. The cell site 104 may identify a selected list of metrics and/or parameter values for the UE 102 to report back to the cell site 104. The UE 102 collects the requested data and reports the results back to the cell site 104, for example the ticket client application 114 or other application on the UE 102 executes the MDT and transmits the results to the cell site 104. The cell site 104 reports the results of the signaling-based MDT to the trace collection 136. A subscriber trace is triggered by the resolution server application 126 in like manner.

The trace collection 130 and optional ancillary functions in the OSS 122 provides a MDT results report to the resolution server application 126 for further processing. For example, optionally the trace collection 130 works with a trace report process server (TRPS) to format and package the MDT results and/or the subscriber trace reports in a trace report. Based on analyzing the MDT results and/or the subscriber trace reports, the resolution server application 126 may provide a proposed resolution for the ticket to the ticket server application 118. The proposed resolution may identify the ticket by a ticket number sent with the ticket data to the resolution server application 126 and/or by the IMSI of the UE 102. The ticket server application 118 may send a command to the ticket client application 114 to adapt the configuration settings of the UE 102 to improve the communication experience of the user.

To trigger a management-based MDT, the resolution server application 126 sends an MDT triggering command to the RAN EMS 128, and the RAN EMS 128 commands the cell site 104 (the serving cell site to the UE 102) as well as commands a plurality of cell sites that are proximate to the cell site 104 to perform an MDT. The cell sites 104 in turn command the associated UEs 102 to execute the MDT. Each UE 104 reports the results of its MDT back to its cell site 104, and the cell sites 104 report the results to the trace collection 130. The cell trace is triggered and launched in a similar fashion.

The resolution server application 126 may trigger a management-based MDT in response to determining that the ticket propagated by the ticket client application 114 and the ticket server application 118 is not an isolated ticket but is one or many like tickets generated by UEs in a relatively delimited and contiguous area. For example, the resolution server application 126 may determine that more than a predefined threshold number of tickets having the same issue category have been reported over a window of time within a delimited set of cell sites 104. For example, 20 tickets having a "poor voice quality" issue are reported by the ticket server application 118 to the resolution server application 126 within a four hour period of time, all related to 5 proximate cell sites.

Figure 2:
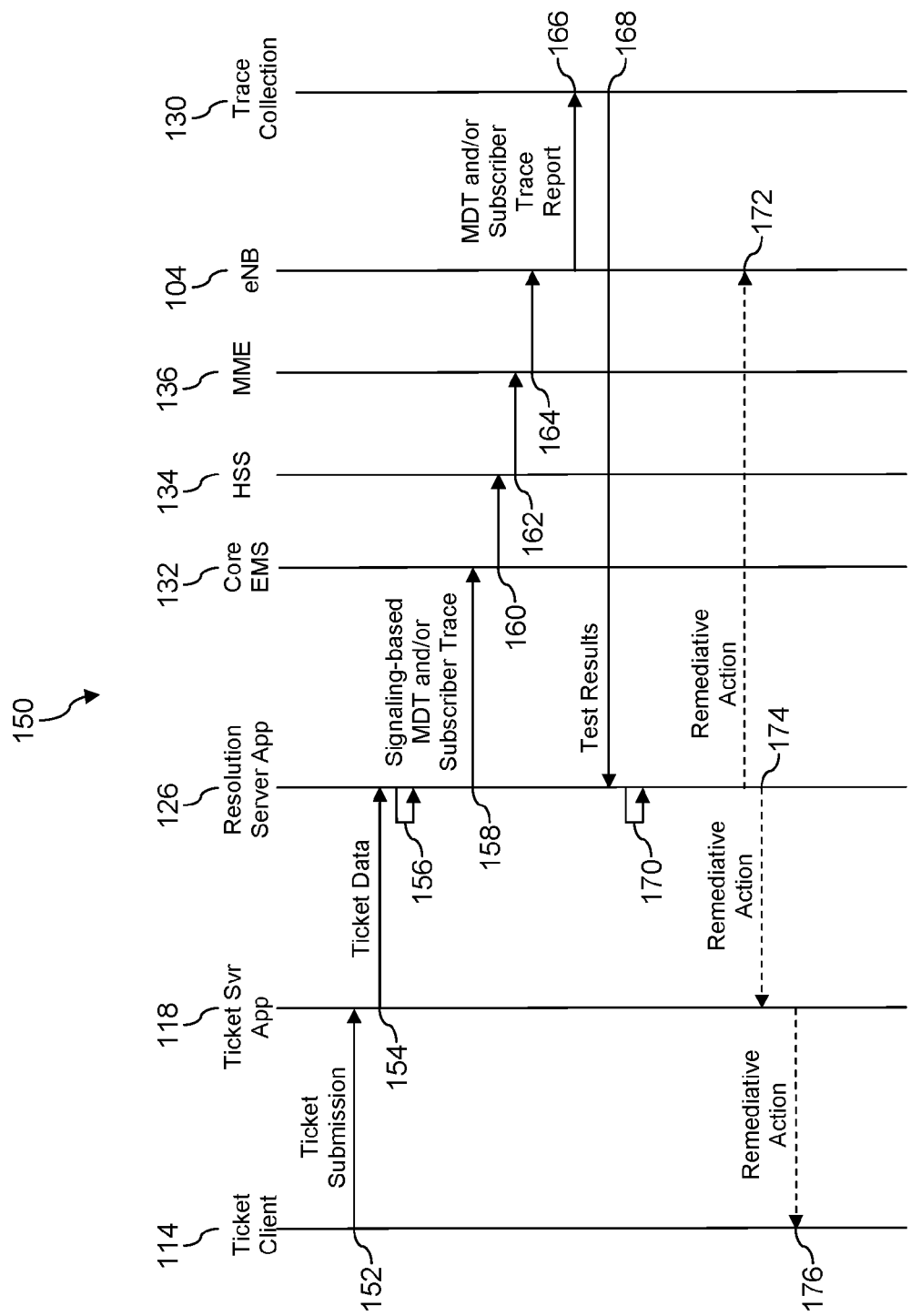
FIG. 2 is a message sequence diagram according to an embodiment of the disclosure.

Turning now to FIG. 2, a first message sequence 150 is described. The message sequence 150 may be performed in the system 100 to accomplish the signaling-based MDT and/or subscriber trace described above. The ticket client application 114 may create a ticket, as described above, and submit the ticket by sending a message 152 to the ticket server application 118. The ticket server application 118 may store the ticket in the ticket data store 120 and analyze the ticket. The ticket server application 118 may send the ticket data in a message 154 to the resolution server application 126 for further analysis. The resolution server application 126 performs an analysis 156 on the ticket data. Based on the analysis, the resolution server application 126 may initiate a signaling-based MDT and/or a subscriber trace by sending a signaling-based MDT and/or subscriber trace command message 158 to the core EMS 132. Because the first message sequence 150 is triggered by the ticket client application 114, in some contexts the ticket client application 114 may be said to trigger the signaling-based MDT and/or to trigger the subscriber trace, albeit this may be deemed indirect triggering. In some contexts, the resolution server application 126 may be said to directly trigger the signaling-based MDT and/or to directly trigger the subscriber trace in that it directly commands the core EMS 132 to execute the signaling-based MDT and/or to execute the subscriber trace.

The core EMS 132 performs the signaling-based MDT via messages 160, 162, and 164. In response to receiving the message 164, the cell site 104 performs the MDT and sends a MDT trace report in a message 166 to the trace collection 130. The cell site 104 commands the UE 102 to execute the MDT and receives the MDT results from the UE 102, as described above. Likewise, the cell site 104 may command the UE 102 to execute the subscriber trace and receive the subscriber trace results from the UE 102. The trace collection 130 and optionally affiliated processes in the OSS 122 format this data and sends associated test results in a message 168 to the resolution server application 126. The resolution server application 126 performs an analysis 170 of the test results and optionally determines a corrective action to perform. The resolution server application 126 accordingly may send a message 172 to command remedial action to the cell site 104 and/or send a message 174 to command remedial action to the ticket server application 118. The ticket server application 118 may send message 176 commanding remedial action to the ticket client application 114. The remedial action commanded to the cell site 104 may command the cell site 104 to change a configuration value, such as to adjust an antenna tilt angle, to adjust a power amplifier gain level, or to adjust other operating parameters of the cell site 104. The remedial action commanded to the ticket server application 118 may command that the UE 102 turn the WiFi radio transceiver 107 on, update the preferred roaming list of the UE 102, update a firmware or software version of the UE 102, or perform another remedial action.

Figure 3:
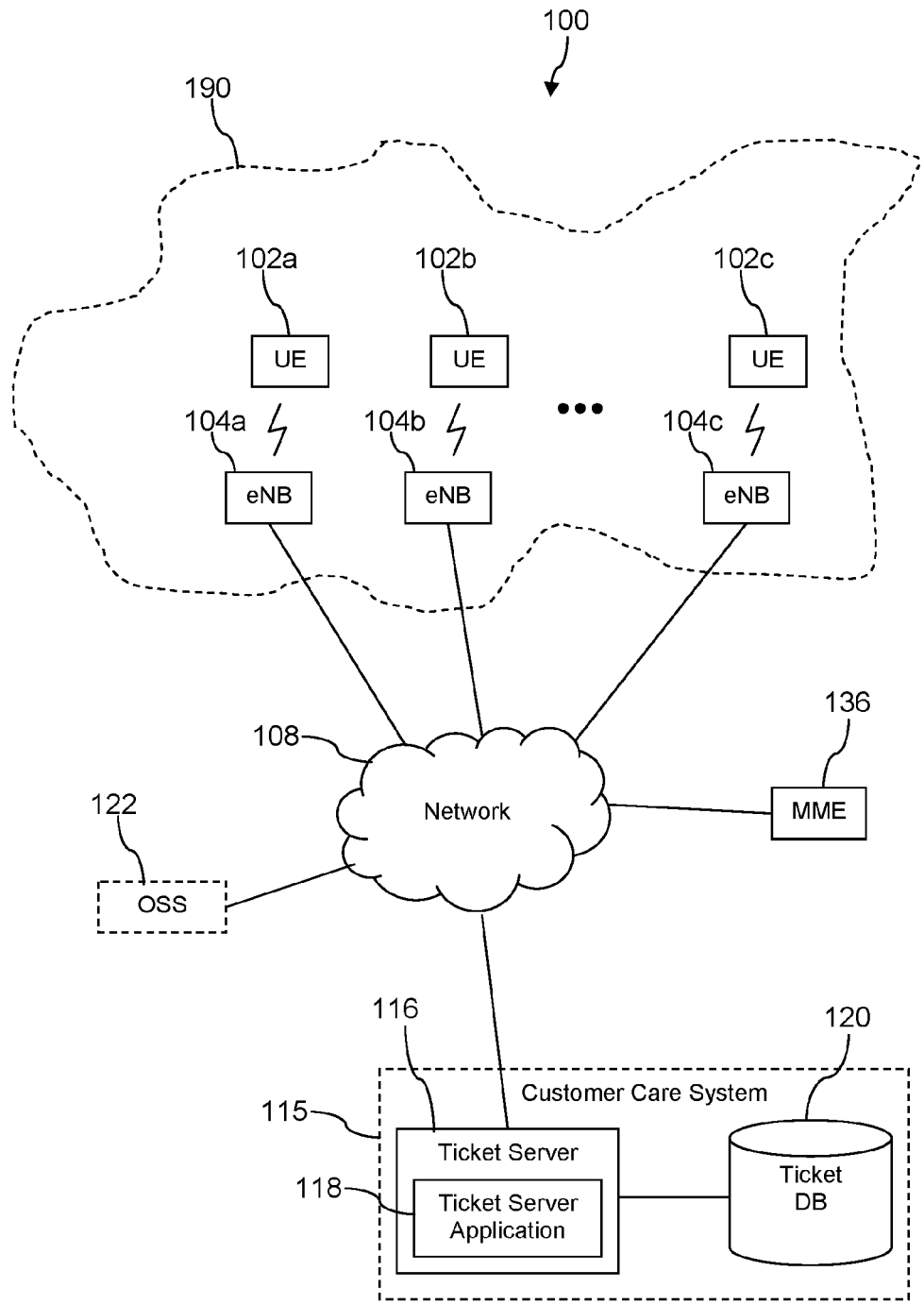
FIG. 3 is a block diagram of another view of the system according to an embodiment of the disclosure.

Turning now to FIG. 3, further details of the system 100 are described. The system 100 may comprise a plurality of cell sites 104 located within a delimited area 190 including a first cell site 104a that provides a wireless communication link to a first UE 102a, a second cell site 104b that provides a wireless communication link to a second UE 102b, and a third cell site 104c that provides a wireless communication link to a third UE 102c. The delimited area 190 may have an arbitrary shape and size. In most cases, the delimited area 190 would be relatively small in area (e.g., less than 100 square miles, less than 300 square miles, less than 600 square miles, or less than 900 square miles) and normally would define a continuous area. There may be any number of cell sites 104 within the delimited area 190. For example, there may be three cell sites, five cell sites, ten cell sites, twenty cell sites, fifty cell sites, or some other number of cell sites within the delimited area 190. A management-based MDT may be triggered by the resolution server application 126 by commanding the RAN EMS 128 to conduct the MDT on each of a plurality of cell sites 104a, 104b, 104c located within the delimited area 190 the resolution server application 126 has determined to be associated with a high level of tickets, for example a number of tickets equal to or exceeding a threshold number of tickets having the same or a related issue category within a predefined window of time. Each of the cell sites 104a, 104b, 104c may in turn command a plurality of UEs 102 that are attached to (e.g., receiving a wireless communication link from) the subject cell site to perform the MDT and return the results of the MDT to the subject cell site. In a like manner, the resolution server application 126 may trigger the cell trace by commanding the RAN EMS 128 to conduct the cell trace and the RAN EMS may command the cell sites 104a, 104b, 104c to perform the cell trace. Each of the cell sites 104a, 104b, 104c may in turn command a plurality of UEs 102 that are attached to the subject cell site to perform the cell trace and return the results of the cell trace to the subject cell site. The cell sites 104a, 104b, 104c return the results of the MDT and cell traces to the trace collection 130.

Figure 4:
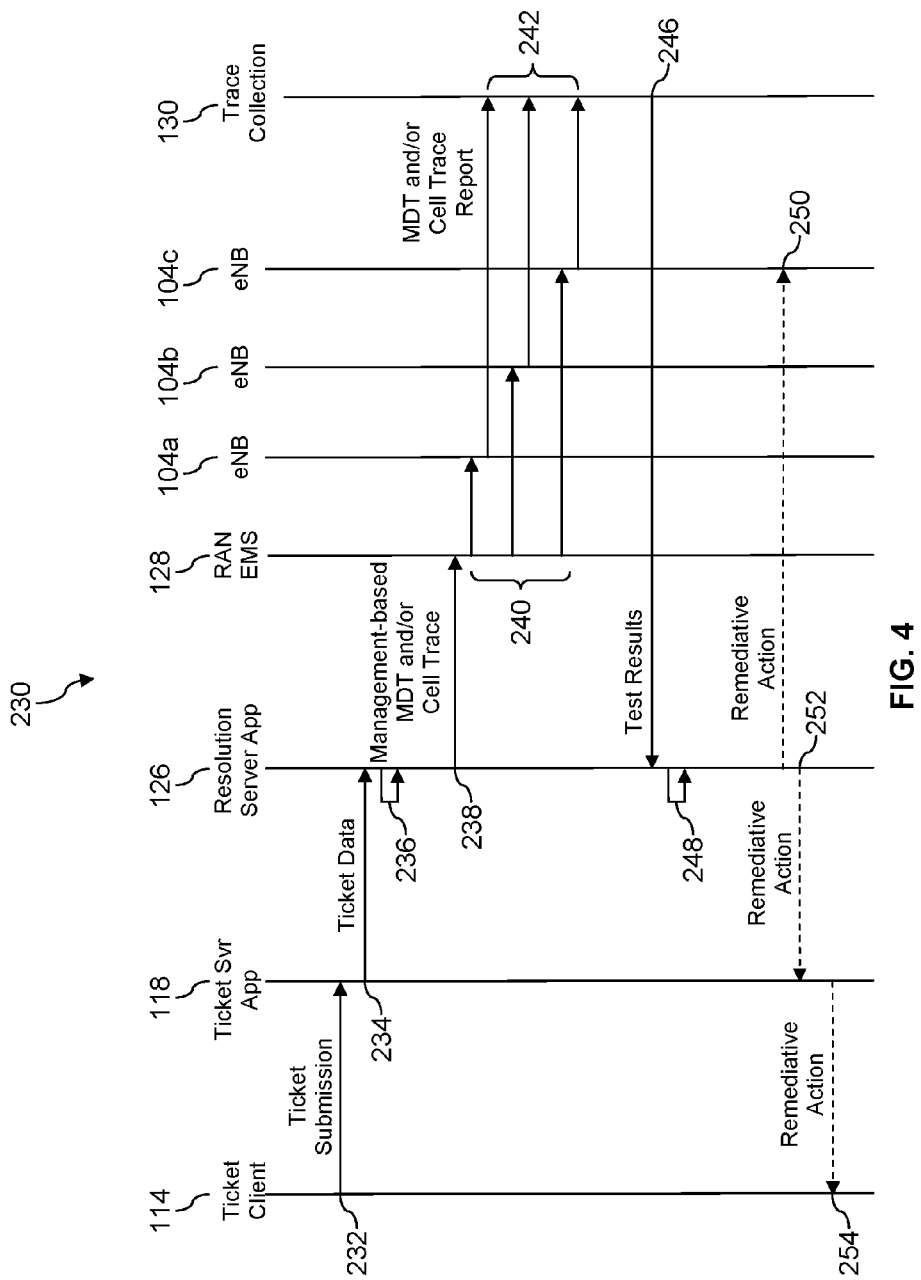
FIG. 4 is another message sequence diagram according to an embodiment of the disclosure.

Turning now to FIG. 4, a second message sequence 230 is described. The ticket client application 114 may create a ticket, as described above, and submit the ticket by sending a message 232 to the ticket server application 118. The ticket server application 118 may store the ticket in the ticket data store 120 and analyze the ticket. The ticket server application 118 may send the ticket data in a message 234 to the resolution server application 126 for further analysis. The resolution server application 126 performs an analysis 236 on the ticket data.

In the case of the second message sequence 230, the resolution server application 126 may determine that more than a threshold number of tickets reporting the same or a like issue category have been submitted by other UEs 102a, 102b, 102c operating within the delimited area 190. The resolution server application 126 may ascribe these different tickets to the same delimited area 190 based on each ticket identifying a serving cell site 104 and based on a data store (not shown) that associates the cell sites 104 to geographical locations. Alternatively, the resolution server application 126 may ascribe these different tickets to the same delimited area 190 based on each ticket identifying a location of the subject UE 102 that submitted each ticket. Based on the analysis 236, the resolution server application 126 accordingly may initiate a management-based MDT and/or a cell trace by sending a management-based MDT and/or cell trace command message 238 to the RAN EMS 128.

The RAN EMS 128 sends MDT and/or cell trace commands 240 to cell sites 104a, 104b, and 104c. The cell sites 104a, 104b, and 104c each performs the MDT and/or cell trace and each sends a MDT and/or cell trace report message 242 to the trace collection 130. The MDT performed by the cell sites 104a, 104b, 104c during the management-based MDT may typically engage a plurality of UEs 102 that are served by each of the cell sites 104. For example, the first cell site 104a may run MDT with each of 10 UEs served at the time by the first cell site 104a; the second cell site 104b may run MDT with each of 10 UEs served at the time by the second cell site 104b; and the third cell site 104c may run MDT with each of 10 UEs served at the time by the third cell site 104c. The MDT conducted between any cell site 104 and any UE 102 may collect the radio signal received power (RSRP) and the radio signal received quality (RSRQ) for that UE 102 wireless link to that serving cell site and for that UE 102 relative to one or more cell site neighboring the serving cell site. The MDT may further collect the geo-location, such as GPS coordinates, of the UE 102. The report that each cell site 104a, 104b, 104c provides in message 242 to the trace collection includes the RSRQ and RSRP values and the geo-location provided by each of the UEs as well as internet protocol (IP) data throughput and radio link failure data for the serving cell site. It is understood that the geo-location data provided by the MDT may be more precise than location data derived from trilateration data. In like manner, cell sites 104a, 104b, 104c may engage UEs 102 attached to the cell site to execute the cell trace and report cell trace results to the subject cell site, and the cell site then report the cell trace results to the trace collection 130.

The trace collection 130 and optionally affiliated processes in the OSS 122 format the data received from the cell sites 104 participating in the management-based MDT and/or cell trace and sends these test results in a message 246 to the resolution server application 126. The resolution server application 126 performs an analysis 248 on the management-based MDT and/or cell trace results. Based on the analysis 248, the resolution server application 126 may command remedial action in a message 250 to at least one of the cell sites 104 involved in the management-based MDT and/or cell trace and/or in a message 252 to the ticket server application 118. The ticket server application 118 may in turn send a command to take remedial action in message 254 to the ticket client 114. Additionally, the resolution server application 126 may send a message or email (not shown) to wireless network infrastructure stake holders, such as network management functions, to identify a wireless coverage hole to be addressed by further network build out, for example for adding one or more additional cell sites to the RAN. The resolution server application 126 may send a message or email to stake holders to identify a wireless coverage overshoot of a cell site.

Figure 5:
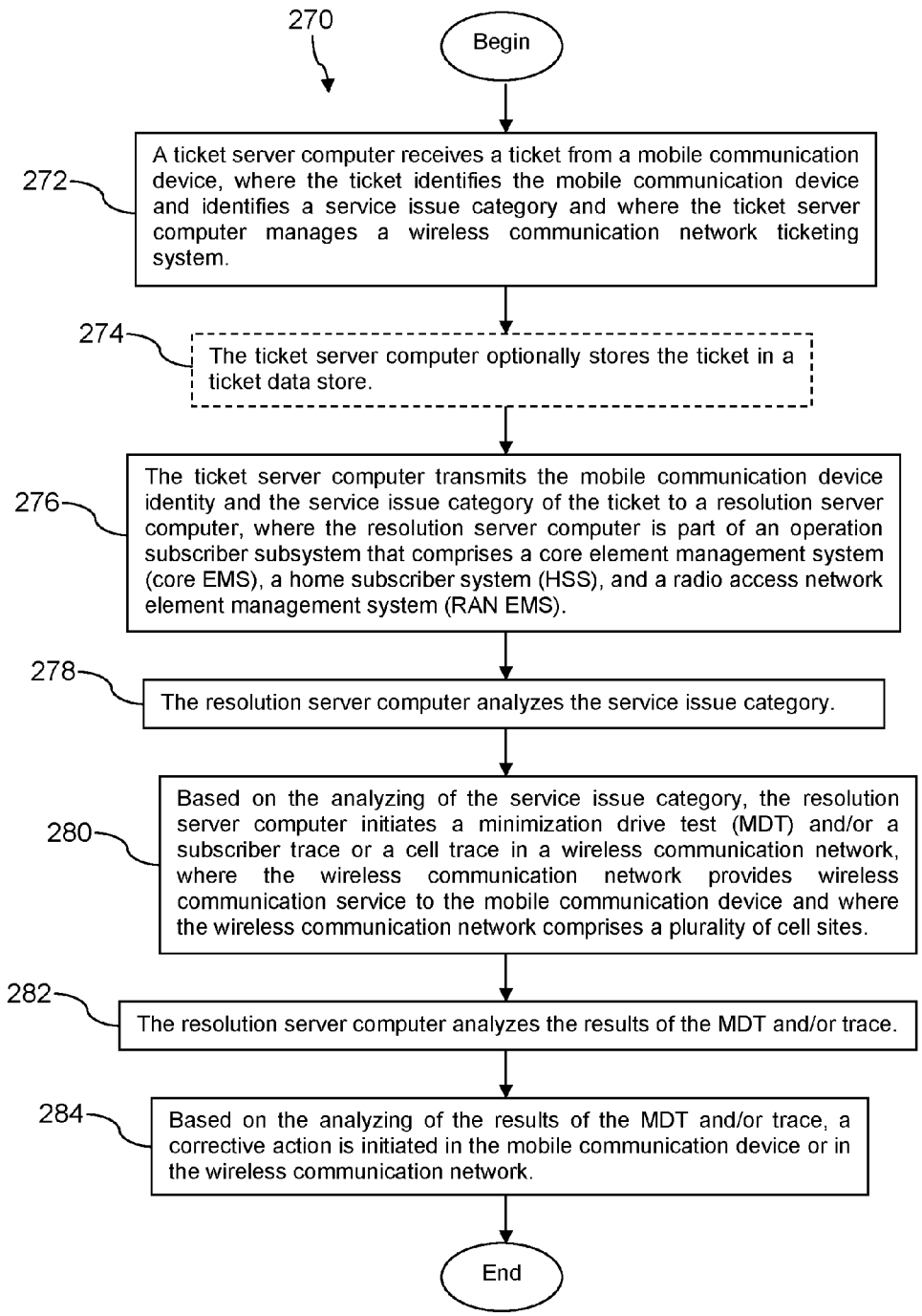
FIG. 5 is a flow chart of a method according to an embodiment of the disclosure.

Turning now to FIG. 5, a method 270 is described. At block 272, a ticket server computer receives a ticket from a mobile communication device, where the ticket identifies the mobile communication device and identifies a service issue category and where the ticket server computer manages a wireless communication network ticketing system. The mobile communication device may be a UE that is a mobile phone, a personal digital assistant (PDA), a media player, a wearable computer, a headset computer, a laptop computer, a tablet computer, or a notebook computer. At block 274, the ticket server computer optionally stores the ticket in a ticket data store.

At block 276, the ticket server computer transmits the mobile communication device identity and the service issue category of the ticket to a resolution server computer, where the resolution server computer is part of an operation subscriber subsystem that comprises a core element management system (core EMS), a home subscriber system (HSS), and a radio access network element management system (RAN EMS). In an embodiment, the ticket server computer may transmit additional data, referred to as ticket data, such as an identity of a service cell site associated with the mobile communication device that transmitted the ticket, an ON/OFF status of a WiFi radio transceiver of the mobile communication device, a hardware version identity of the mobile communication device, a firmware and/or software version identity of the mobile communication device, and other information.

At block 278, the resolution server computer analyzes the service issue category. The resolution server computer may also analyze other ticket data in block 278. At block 280, based on the analyzing of the service issue category, the resolution server computer initiates a minimization drive test (MDT), a subscriber trace, and/or a cell trace in a wireless communication network, where the wireless communication network provides wireless communication service to the mobile communication device and where the wireless communication network comprises a plurality of cell sites.

At block 282, the resolution server computer analyzes the results of the MDT, the subscriber trace, and/or the cell trace. The cell sites involved in the MDT, the subscriber trace, and/or the cell trace may report results back to a trace collection function that packages the test results into an MDT and/or trace results report and provides this to the resolution server computer. At block 284, based on the analyzing of the results of the MDT, subscriber trace, and/or cell trace, a corrective action is initiated in the mobile communication device or in the wireless communication network.

Figure 6:
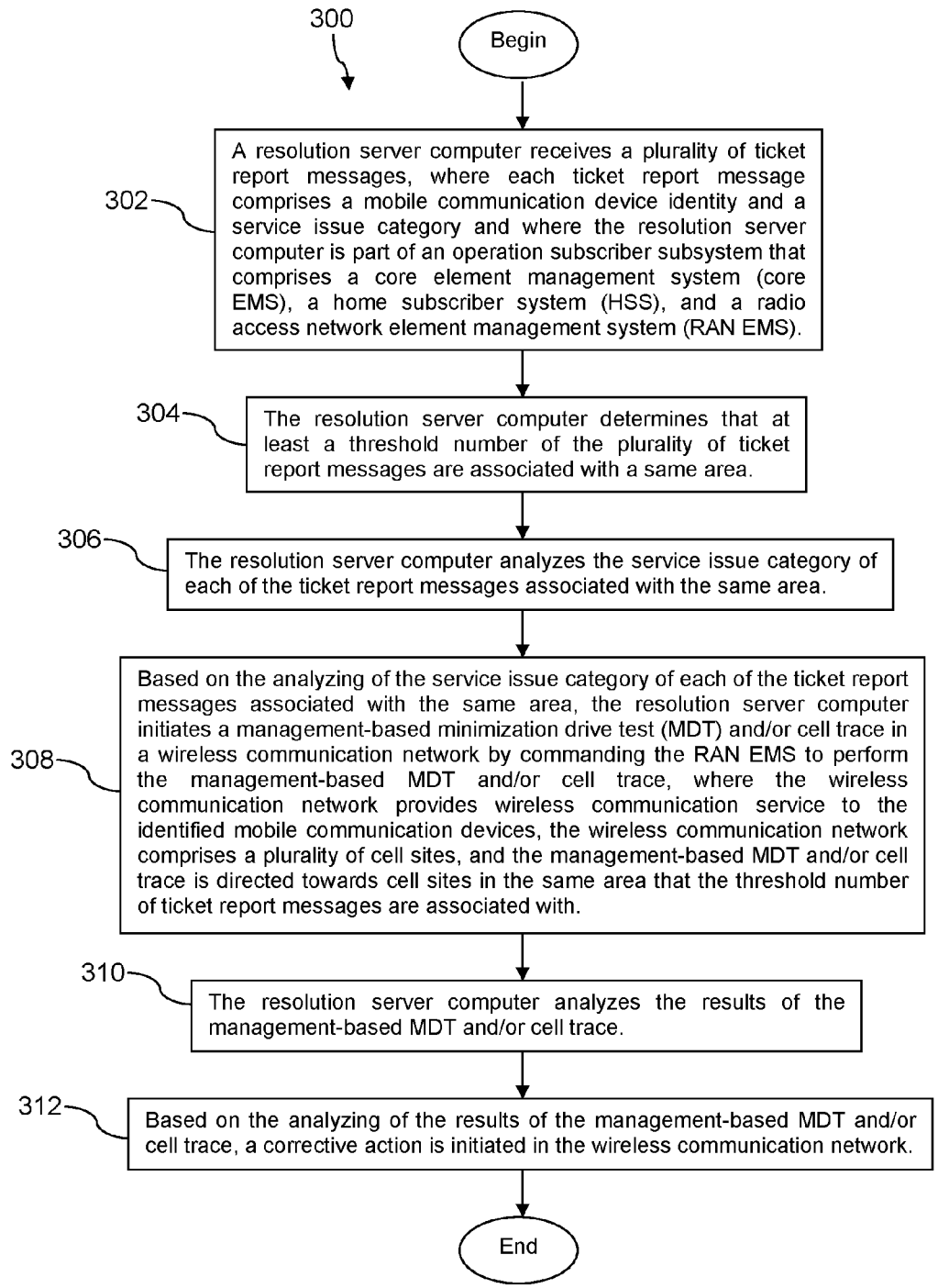
FIG. 6 is a flow chart of another method according to an embodiment of the disclosure.

Turning now to FIG. 6, a method 300 is described. At block 302, a resolution server computer receives a plurality of ticket report messages, where each ticket report message comprises a mobile communication device identity and a service issue category and where the resolution server computer is part of an operation subscriber subsystem that comprises a core element management system (core EMS), a home subscriber system (HSS), and a radio access network element management system (RAN EMS). In an embodiment, the ticket report message may comprise additional data, referred to as ticket data, such as an identity of a service cell site associated with the mobile communication device that transmitted the ticket, an ON/OFF status of a WiFi radio transceiver of the mobile communication device, a hardware version identity of the mobile communication device, a firmware and/or software version identity of the mobile communication device, and other information. At block 304, the resolution server computer determines that at least a threshold number of the plurality of ticket report messages are associated with a same area.

At block 306, the resolution server computer analyzes the service issue category of each of the ticket report messages associated with the same area. At block 308, Based on the analyzing of the service issue category of each of the ticket report messages associated with the same area, the resolution server computer initiates a management-based minimization drive test (MDT) in a wireless communication network by commanding the RAN EMS to perform the management-based MDT, where the wireless communication network provides wireless communication service to the identified mobile communication devices, the wireless communication network comprises a plurality of cell sites, and the management-based MDT is directed towards cell sites in the same area that the threshold number of ticket report messages are associated with. The several cell sites and/or mobile communication devices involved in the management-based MDT may report their test results back to a trace collection entity, and the trace collection entity may package and format the test results into a MDT results report and send the MDT results report to the resolution server computer. Alternatively, or in addition, based on analyzing the service issue category of each of the ticket report messages associated with the same area, the resolution server computer initiates a cell trace by commanding the RAN EMS to perform the cell trace, as described further above.

At block 310, the resolution server computer analyzes the results of the management-based MDT and/or the cell trace. At block 312, based on the analyzing of the results of the management-based MDT and/or cell trace, a corrective action is initiated in the wireless communication network.

Figure 7:
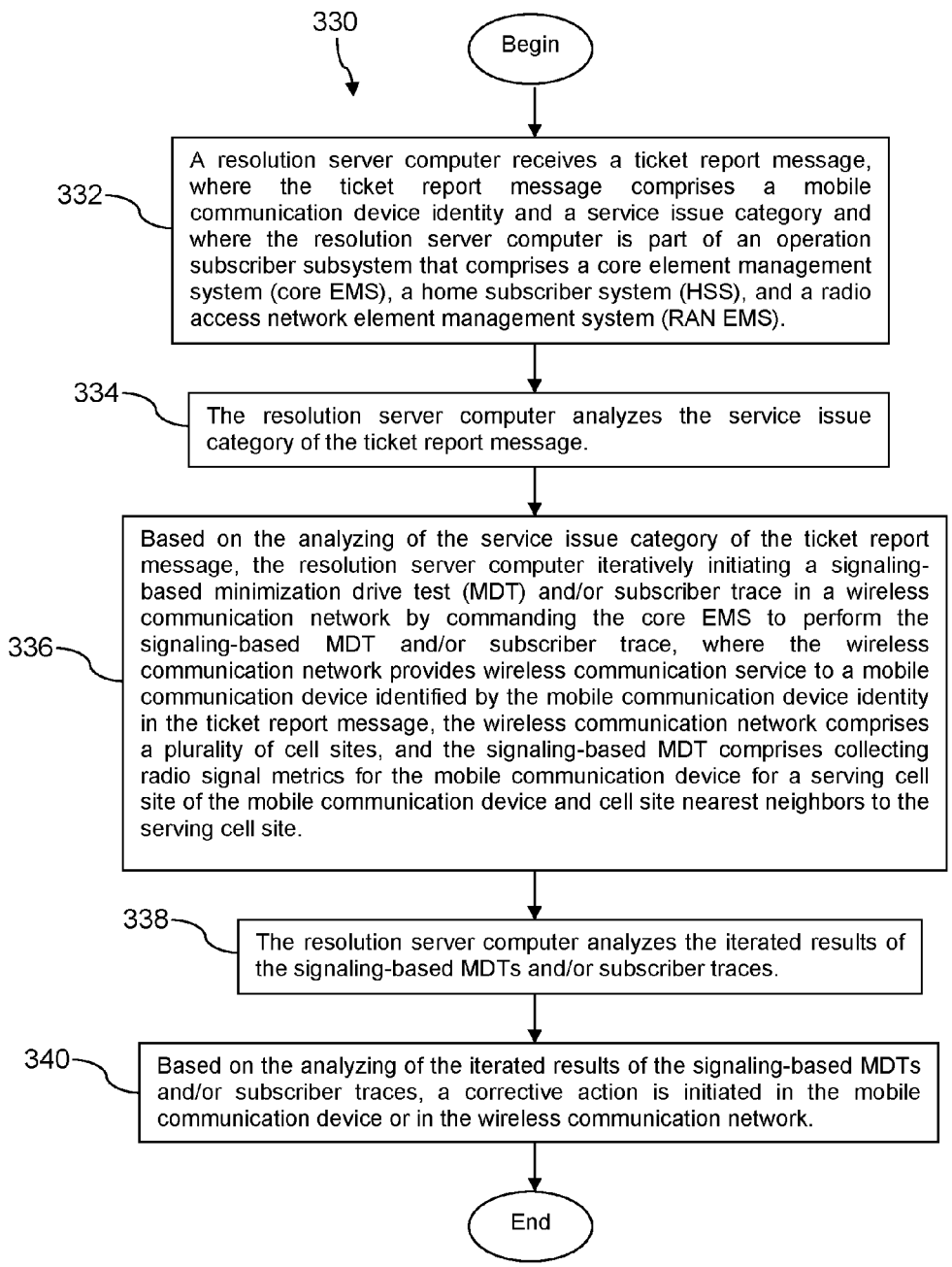
FIG. 7 is a flow chart of yet another method according to an embodiment of the disclosure.

Turning now to FIG. 7, a method 330 is described. At block 332, a resolution server computer receives a ticket report message, where the ticket report message comprises a mobile communication device identity and a service issue category and where the resolution server computer is part of an operation subscriber subsystem that comprises a core element management system (core EMS), a home subscriber system (HSS), and a radio access network element management system (RAN EMS). In an embodiment, the ticket report message may comprise additional data, referred to as ticket data, such as an identity of a service cell site associated with the mobile communication device that transmitted the ticket, an ON/OFF status of a WiFi radio transceiver of the mobile communication device, a hardware version identity of the mobile communication device, a firmware and/or software version identity of the mobile communication device, and other information. At block 334, the resolution server computer analyzes the service issue category of the ticket report message.

At block 336, based on the analyzing of the service issue category of the ticket report message, the resolution server computer iteratively initiating a signaling-based minimization drive test (MDT) and/or a subscriber trace in a wireless communication network by commanding the core EMS to perform the signaling-based MDT and/or the subscriber trace, where the wireless communication network provides wireless communication service to a mobile communication device identified by the mobile communication device identity in the ticket report message, the wireless communication network comprises a plurality of cell sites, and the signaling-based MDT comprises collecting radio signal metrics for the mobile communication device for a serving cell site of the mobile communication device and cell site nearest neighbors to the serving cell site. By "iteratively initiating" a signaling-based MDT and/or a subscriber trace, it is meant to indicate that the signaling-based MDT and/or subscriber trace is repeated a plurality of times, for example periodically for a duration of time. For example, the signaling-based MDT and/or subscriber trace may be repeated every minute for a duration of four hours. The iterative signaling-based MDTs and/or subscriber traces can produce a comprehensive performance profile of the mobile communication device.

At block 338, the resolution server computer analyzes the iterated results of the signaling-based MDTs and/or subscriber traces. At block 340, based on the analyzing of the iterated results of the signaling-based MDTs and/or the subscriber traces, a corrective action is initiated in the mobile communication device or in the wireless communication network. It is understood that the resolution server and/or the resolution server application 126 may execute or trigger execution of a signaling-based MDT and a management-based MDT concurrently. Likewise, the resolution server 124 and/or the resolution server application 126 can execute or trigger execution of a subscriber trace and a cell trace concurrently.

Figure 8:
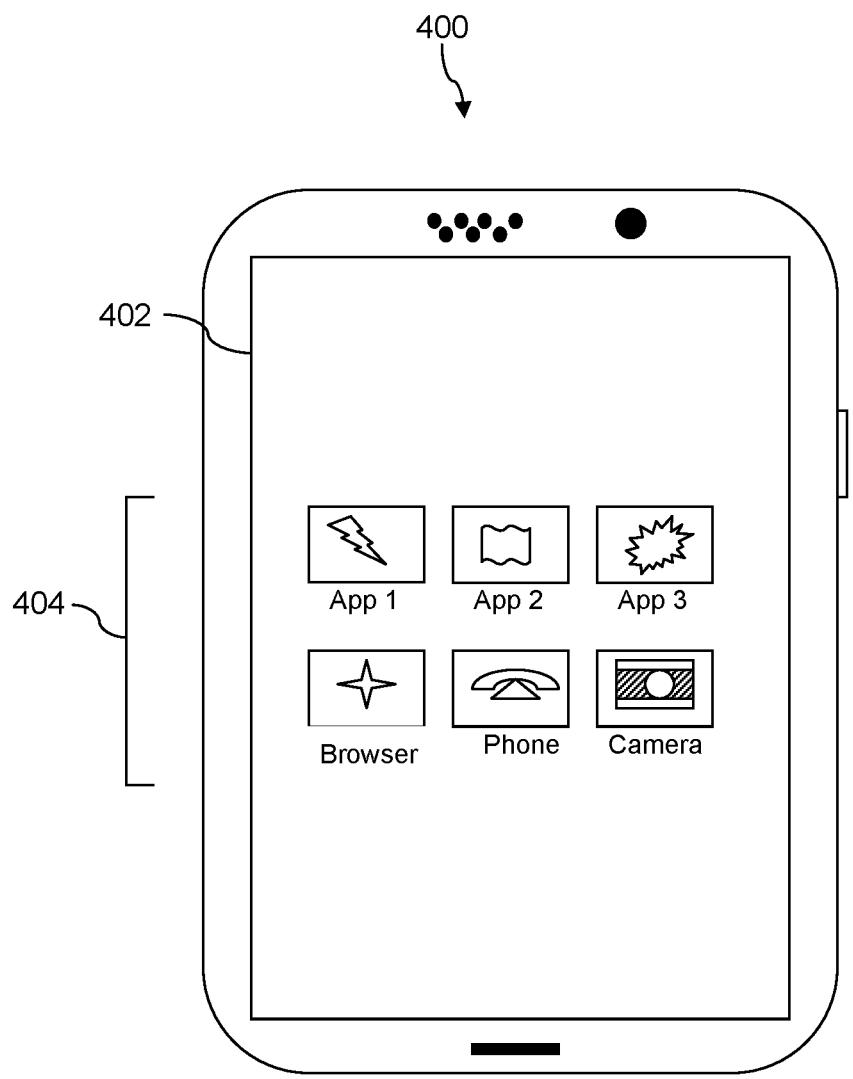
FIG. 8 is an illustration of a user equipment (UE) according to an embodiment of the disclosure.

FIG. 8 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 9:
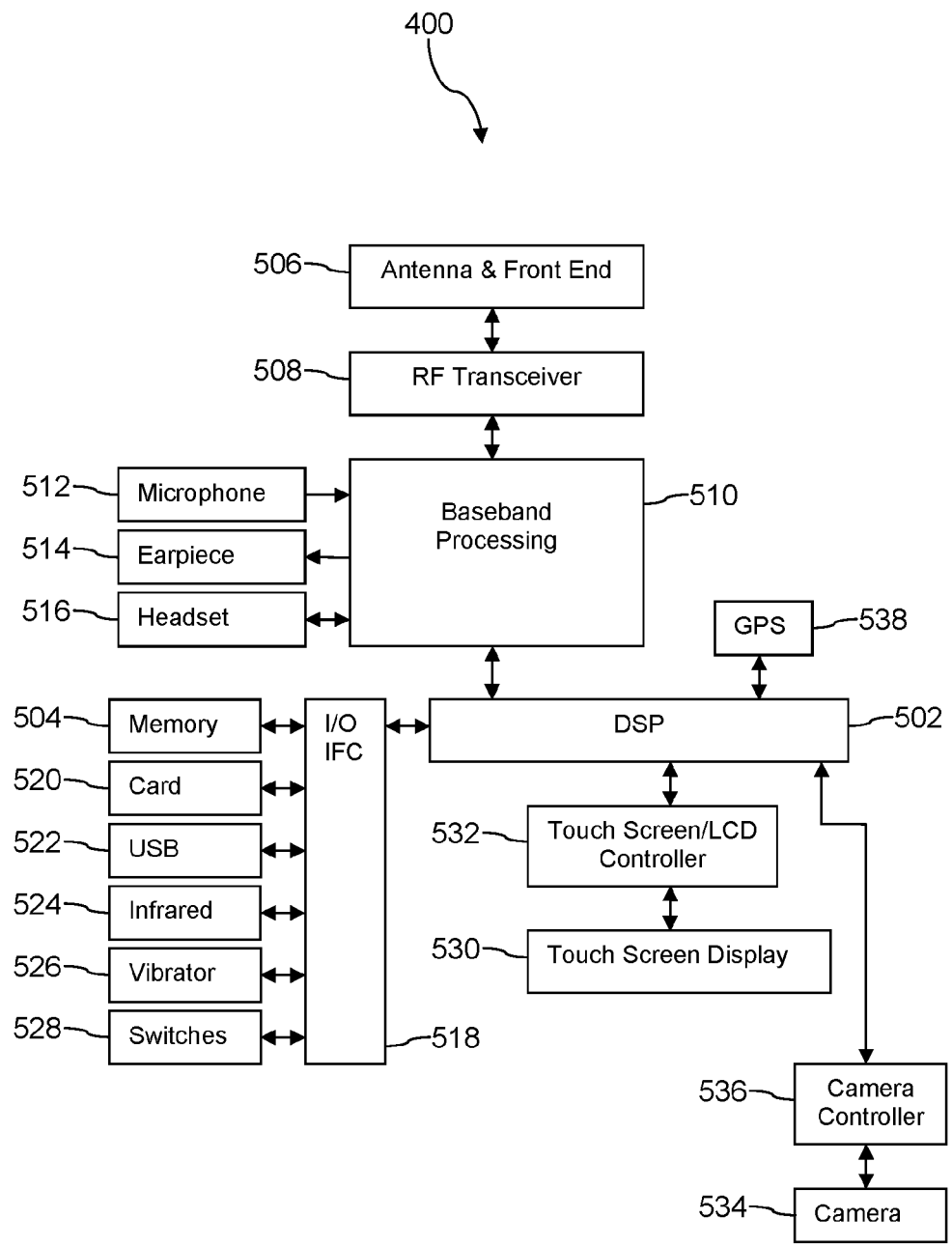
FIG. 9 is a block diagram of a hardware architecture of a user equipment (UE) according to an embodiment of the disclosure.

FIG. 9 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 10A:
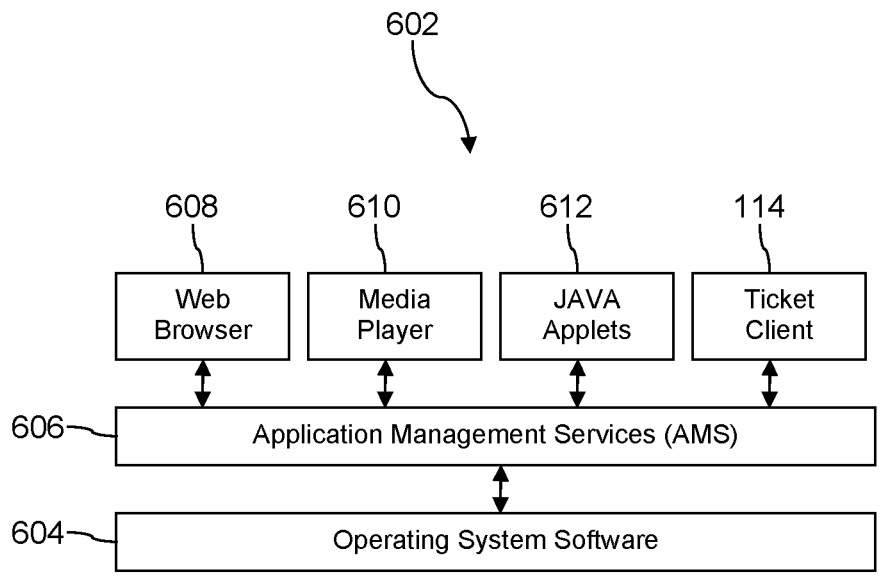
FIG. 10A is a block diagram of a software architecture of a user equipment (UE) according to an embodiment of the disclosure.

FIG. 10A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 10A are a web browser application 608, a media player application 610, JAVA applets 612, and the ticket client application 114 The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 10B:
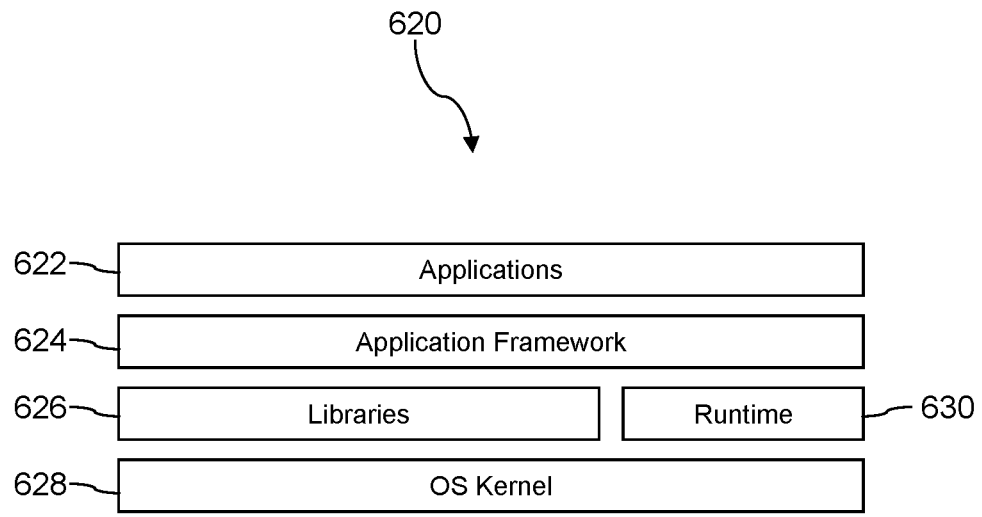
FIG. 10B is a block diagram of another software architecture of a user equipment (UE) according to an embodiment of the disclosure.

FIG. 10B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 11:
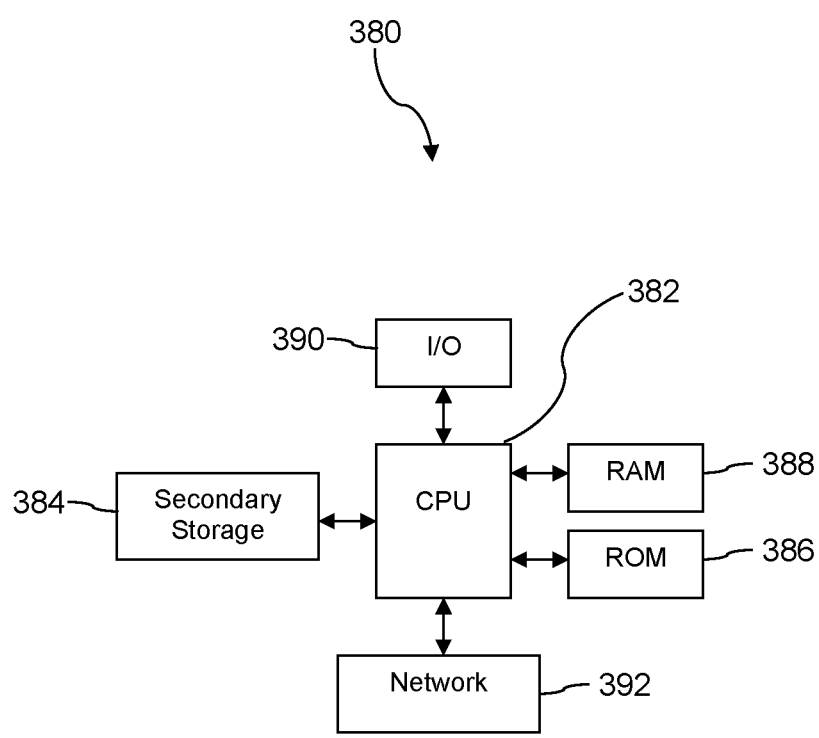
FIG. 11 is a block diagram of a computer system according to an embodiment of the disclosure.

FIG. 11 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), world-wide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of identifying and remediating wireless communication issues, comprising:

receiving a ticket from a mobile communication device by a ticket server computer, where the ticket identifies the mobile communication device and identifies a service issue category and where the ticket server computer manages a wireless communication network ticketing system;

storing the ticket in a ticket data store by the ticket server computer;

transmitting the mobile communication device identity and the service issue category of the ticket from the ticket server computer to a resolution server computer, where the resolution server computer is part of an operation subscriber subsystem that comprises a core element management system (core EMS), a home subscriber system (HSS), and a radio access network element management system (RAN EMS);

analyzing the service issue category by the resolution server computer;

based on the analyzing of the service issue category, initiating a minimization of drive test (MDT) in a wireless communication network by the resolution server computer, where the wireless communication network provides wireless communication service to the mobile communication device and where the wireless communication network comprises a plurality of cell sites;

analyzing the results of the MDT by the resolution server computer; and based on the analyzing of the results of the MDT, initiating a corrective action in the mobile communication device or in the wireless communication network.

2. The method of claim 1, wherein the mobile communication device is one of a mobile phone, a personal digital assistant (PDA), a media player, a wearable computer, a headset computer, a laptop computer, a notebook computer, or a tablet computer.

3. The method of claim 1, wherein the ticket further identifies a serving cell that provides wireless communication coverage to the mobile communication device.

4. The method of claim 1, further comprising
initiating one of a subscriber trace or a cell trace based on analyzing the service issue category; and
analyzing the results of the trace,
wherein the corrective action is further initiated based on analyzing the results of the trace.

5. The method of claim 1, wherein the ticket identifies the mobile communication device by comprising an international mobile subscriber identity (IMSI).

6. The method of claim 1, wherein the ticket further identifies a status of a WiFi radio transceiver of the mobile communication device as one of ON or OFF.

7. The method of claim 6, wherein the corrective action comprises the resolution server computer recommending to the ticket server computer that the mobile communication device turn its WiFi radio transceiver to ON.

8. The method of claim 1, wherein the corrective action comprises commanding a cell site to adjust an antenna tilt.

9. The method of claim 1, wherein the MDT determines a radio signal received quality (RSRQ), a radio signal received power (RSRP), and a geo-location of the mobile communication device, Internet protocol data throughput of a serving cell site associated with the mobile communication device, and a radio link failure data of the serving cell site.

10. A method of identifying and remediating wireless communication issues, comprising:
receiving a plurality of ticket report messages by a resolution server computer, where each ticket report message comprises a mobile communication device identity and a service issue category and where the resolution server computer is part of an operation subscriber subsystem that comprises a core element management system (core EMS), a home subscriber system (HSS), and a radio access network element management system (RAN EMS);
determining by the resolution server computer that at least a threshold number of the plurality of ticket report messages are associated with a same area;
analyzing the service issue category of each of the ticket report messages associated with the same area by the resolution server computer;
based on the analyzing of the service issue category of each of the ticket report messages associated with the same area, initiating a management-based minimization of drive test (MDT) or a cell trace in a wireless communication network by the resolution server computer commanding the RAN EMS to perform the management-based MDT or the cell trace, where the wireless communication network provides wireless communication service to the identified mobile communication devices, the wireless communication network comprises a plurality of cell sites, and the management-based MDT or cell trace is directed towards cell sites in the same area that the threshold number of ticket report messages are associated with;
analyzing the results of the management-based MDT or the cell trace by the resolution server computer; and
based on the analyzing of the results of the management-based MDT or cell trace, initiating a corrective action in the wireless communication network.

11. The method of claim 10, wherein the same area is a continuous area of less than 300 square miles.

12. The method of claim 10, wherein the cell sites in the same area provide wireless communication coverage to mobile communication devices according to a long-term evolution (LTE), a code division multiple access (CDMA), a global system for mobile communication (GSM), or a worldwide interoperability for microwave access (WiMAX) telecommunication protocol or according to a combination thereof.

13. The method of claim 10, wherein the corrective action initiated is filling a wireless coverage hole by building a cell site.

14. The method of claim 10, wherein the corrective action initiated is reducing a coverage overshoot of a cell site.

15. A method of identifying and remediating wireless communication issues, comprising:
receiving a ticket report message by a resolution server computer, where the ticket report message comprises a mobile communication device identity and a service issue category and where the resolution server computer is part of an operation subscriber subsystem that comprises a core element management system (core EMS), a home subscriber system (HSS), and a radio access network element management system (RAN EMS);
analyzing the service issue category of the ticket report message by the resolution server computer;
based on the analyzing of the service issue category of the ticket report message, iteratively initiating a signaling-based minimization of drive test (MDT) or a subscriber trace in a wireless communication network by the resolution server computer commanding the core EMS to perform the signaling-based MDT, where the wireless communication network provides wireless communication service to a mobile communication device identified by the mobile communication device identity in the ticket report message, the wireless communication network comprises a plurality of cell sites, and the signaling-based MDT comprises collecting radio signal metrics for the mobile communication device for a serving cell site of the mobile communication device and cell site nearest neighbors to the serving cell site;
analyzing the iterated results of the signaling-based MDTs by the resolution server computer; and
based on the analyzing of the iterated results of the signaling-based MDTs, initiating a corrective action in the mobile communication device or in the wireless communication network.

16. The method of claim 15, wherein iteratively initiating the signaling-based MDT comprises the resolution server computer initiating the signaling-based MDT periodically for a predefined period of time.

17. The method of claim 16, wherein the resolution server computer initiates the signaling-based MDT every about one minute for about four hours.

18. The method of claim 15, where the mobile communication device is one of a mobile phone, a personal digital assistant (PDA), a media player, a wearable computer, a headset computer, a laptop computer, a notebook computer, or a tablet computer.

19. The method of claim 15, wherein the ticket report message further identifies a serving cell that provides wireless communication coverage to the mobile communication device.

20. The method of claim 19, wherein the ticket report message further identifies a firmware version of the mobile communication device.

\* \* \* \* \*